Jan. 13, 1953
J. H. HODES, JR
2,625,173
NONFREEZE FAUCET
Filed Feb. 13, 1948
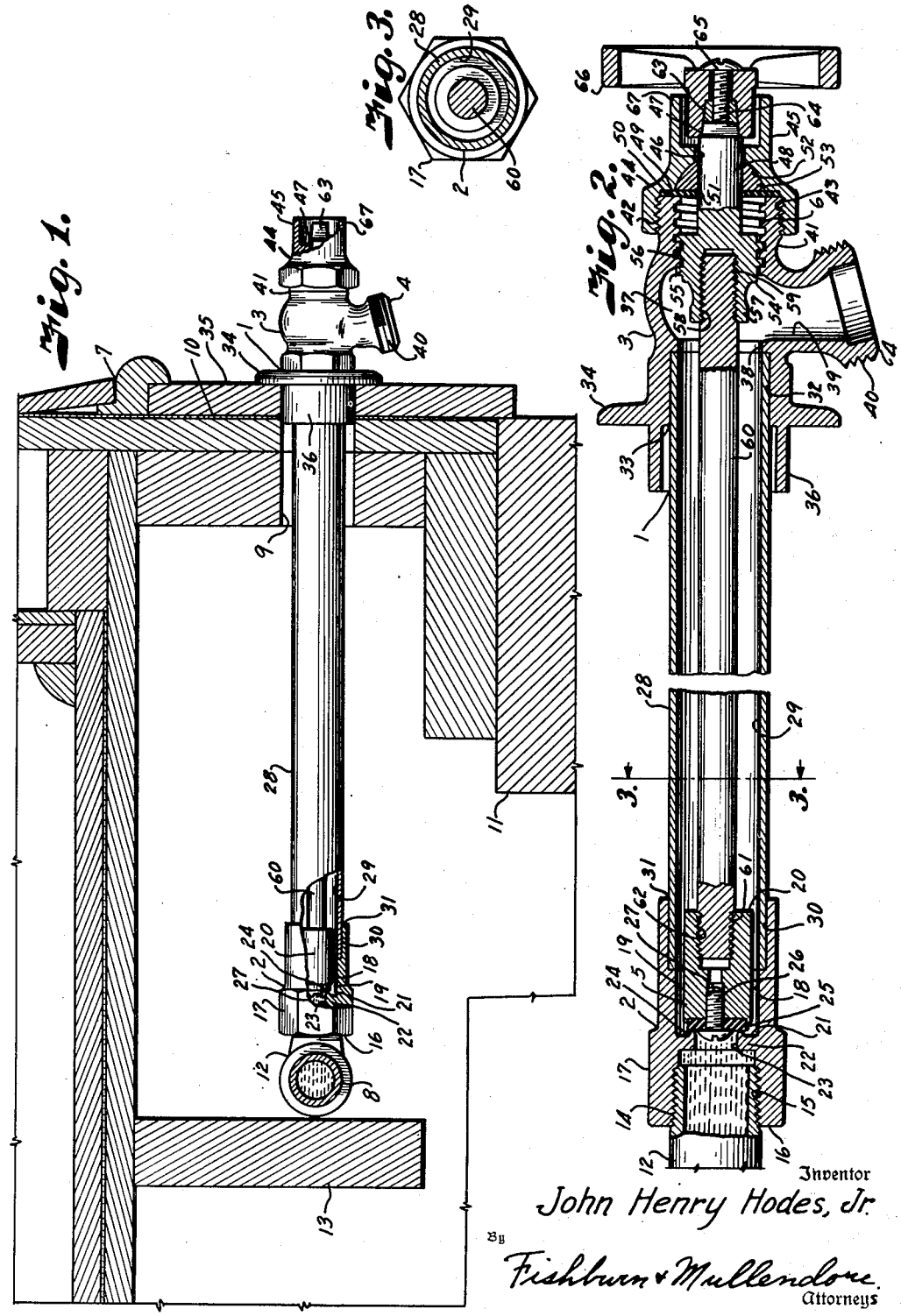
Inventor
John Henry Hodes, Jr.
By Fishburn & Mullendore
Attorneys Patented Jan. 13, 1953

2,625,173

UNITED STATES PATENT OFFICE 2,625,173

NONFREEZE FAUCET

John Henry Hodes, Jr., Kansas City, Mo.

Application February 13, 1948, Serial No. 8,181

1 Claim. (Cl. 137—360)

This invention relates to faucets and more particularly to a nonfreeze faucet for locating a water outlet on the outside of a wall of a building and the like, said faucet having connection with the water service in the building, and has for its principal object to provide an outside water faucet which may be used in all weather conditions without danger of freezing.

It is customary to provide buildings and the like, particularly those having city water service, with a water connection extending through a wall of said building and terminating in a faucet on the outside of said building. Such faucets include body members enclosing a valve, all of which are located on the outside of the building. The faucets also usually provide hose connections for use in watering lawns and the like, the control of the flow of water being at the faucet without entering the building. In locations where the winter temperatures go below freezing, it is necessary to cut off flow of water to the outside connection and drain the pipe leading through the building wall to the faucet in order to protect the pipe against freezing and bursting. In other words, the outside water supply is cut off in winter and in case of need to use same it is necessary to operate the control valve in the building or basement thereof. People quite often forget to turn off the water and drain the pipe whereby a cold period results in frozen pipes and expensive replacements.

Other objects of the present invention are to provide a single valve for complete nonfreeze control of an outside water connection; to provide a faucet with a control at the outlet which cuts off flow at a point in the flow line inside the building where normal temperatures eliminate possibility of freezing of the faucets and water connection; to provide a nonfreeze faucet in which the connection to the faucet is always open from a point inside the building to the outlet permitting complete drainage of the connection; and to provide a simple, economical nonfreeze faucet structure of low initial installation cost and capable of eliminating any danger of freezing of the outside water connection.

In accomplishing these and other objects of the present invention, I have provided improved details of structure the preferred forms of which are illustrated in the accompanying drawings, wherein:

Fig. 1 is a sectional view through a portion of a building illustrating the installation of a nonfreeze faucet therein.

Fig. 2 is a longitudinal sectional view through the nonfreeze faucet.

Fig. 3 is a transverse sectional view through the faucet connection on the line 3—3, Fig. 2.

Referring more in detail to the drawings:

1 designates a nonfreeze faucet generally consisting of a valve seat member 2 having flow connection with a body 3 and an outlet 4, a valve 5 controlled by mechanism 6 in the body being provided for interrupting flow of liquid through the faucet. The nonfreeze faucet is adapted for use in connection with a building 7 and the like having a pressure water system including suitable piping 8 in the building, for example in the basement thereof where there is usually sufficient heat on cold days of winter to prevent the water system from freezing.

In order to provide an outside water connection, an aperture 9 is provided in the outer wall 10 of the building or in the foundation 11 thereof as desired. In the present instance the water piping is provided with a suitable fitting 12 arranged adjacent a joist 13 spaced from the outer wall 10, said fitting having external threads 14 adapted to form a watertight connection with an internally threaded socket 15 at the inlet end 16 of the valve seat member 2, said seat member preferably being provided with a polygonal shaped portion 17, for example hexagonal shape, on the exterior of said seat member for facilitating the screwing of the seat member onto the pipe fitting 12. The outlet end of the valve seat member is provided with a counterbore 18 of sufficient size to provide clearance 19 around a valve member 20 for flow of water through the outlet portion of the valve seat member, said counterbore 18 terminating, as at 21, in spaced relation with the threaded inlet bore 15 to form a partition 22 therebetween, said partition having a reduced bore 23 therein surrounded on the outlet side of said partition by a peripheral rib or seat 24 engageable by a valve washer 25 secured on the inlet end of the valve member by a screw 26 threaded into a threaded bore 27 of said valve member, the washer preferably being of suitable resilient material such as rubber, fiber, plastic and the like for cooperation with the peripheral rib 24 to form a suitable seat for interrupting flow of water through the bore 23.

Suitably secured to the outlet end of the valve seat member is a tube 28, preferably having a bore 29 therein of the same diameter as the counterbore 18, the tube being suitably secured to the valve seat member as by inserting the inlet end of the tube into a counterbore 30 in the outlet end of the valve seat member, said bore preferably terminating in spaced relation with the partition 22 and being of substantially the same size as the diameter of the tube 28 to form a tight fit therewith. The tube and valve seat member may be soldered together or otherwise suitably secured as at 31 to prevent leakage through the connection thereof. The tube 28 is of suitable length to extend through the opening 9 in the building wall 10, the outlet end of said tube preferably being a press fit in a bore 32 in the inlet end of the body 3 and suitably soldered therein as at 33. The inlet end of the faucet body 3 is preferably provided with a flange 34, the tube 28 preferably being of such length that said flange will substantially engage the outer surface 35 of the building wall 10, said flange being of sufficient diameter to completely cover the opening 9.

In instances where the nonfreezing faucet is placed in a completed building, the opening 9 must be of sufficient size to pass the polygonal shaped portion 17 of the valve seat member. In such instances, if desired, the inlet end of the body 3 may be provided with an annular rib 36 of such size as to closely engage the walls of the opening 9 to prevent lateral movement of the faucet. The arrangement of the rib for engaging in an opening of a wall to support the body member eliminates stress on the thin walled tubular member and its connection with the body member. If the annular rib should become bent or otherwise distorted in mounting the faucet in a wall or for other reason, such deformation would not affect the connection of the tubular member and body member, or cause leaks therein. The body 3 is provided with a chamber 37 having communication with the bore 29 of the tube 28 through a bore 38 preferably substantially the same size as the bore 29. The outlet fitting 4 is preferably integral with the body 3 and extends laterally thereof, said outlet having a bore 39 communicating with the chamber 37 for flow of water from the faucet. The outlet fitting preferably is directed downwardly whereby no water may be trapped in the body chamber. Said outlet fitting may be provided with external threads 40 for suitably securing a hose connection thereto.

The body 3 is provided with a neck 41 coaxial with the bore 32 and tube 28, said neck having external threads 42 adjacent the end thereof for receiving internal threads 43 of a cap unit 44, said cap unit having an outwardly extending boss 45 bored as at 46 whereby the outer end 47 of a stem 48 may extend therethrough. The cap unit 44 is preferably provided with a shoulder 49 and the end of the neck 41 is flattened whereby a gasket member 50 may be clamped therebetween to prevent leakage between the body and cap member. The gasket 50 is provided with a bore 51 substantially the same size as the stem 48 and the cap unit is provided with a spherical recess 52 to receive a sealing member 53 of lead or other suitable material, which on tightening of the cap unit onto the neck 41 is squeezed into engagement with the periphery of the stem 40. The stem 48 projects into the neck 41 and is provided with an enlarged portion 54 having external threads 55 engaged in internal threads 56 in the neck 41. The inner end of the stem 48 is provided with a boss 57 which extends into the chamber 37 and is provided with a threaded socket 58 engaging external threads 59 of a valve rod 60 for securing said rod to the stem. The rod is preferably of material having substantially the same coefficient of expansion as the tube 28, said rod extending through the tube 28 and having the opposite end thereof suitably secured to the valve member 20 as, for example, by external threads 61 on the valve rod being engaged in a threaded socket 62 in the outlet end of the valve member. With this arrangement, turning of the stem 48 threads the enlarged portion thereof in the threaded neck 41 to move the valve member 20 longitudinally of the tube 28, rotation in one direction retracting the valve member from the valve seat or rib 24 to open the faucet and permit flow of water therethrough and rotation in the other direction moves the valve member 20 toward the seat 24 to interrupt flow of water through the faucet.

In order to facilitate turning of the stem 48 the outer end 47 thereof is preferably provided with a polygonal shape for instance a square boss 63, said boss having a threaded bore 64 therein for receiving a screw 65 for securing a suitable handwheel 66 to the stem. The cap unit 44 may be provided with an outwardly projecting annular flange 67 extending beyond the squared portion of the stem whereby the handwheel 66 may be removed and the flange will prevent turning of the stem except by use of a suitable wheel having a hub portion adapted to extend into the recess formed by the flange 67 and engage the outer end 47 of the stem.

In using a nonfreeze faucet constructed and assembled as described, it is essential that the tube 28 and valve rod 60 be of sufficient length to extend through an opening 9 in the wall of a building whereby the flange 34 substantially engages the outer surface 35 of said building wall, and the valve seat member be positioned in the interior of the building in spaced relation to the outer wall thereof sufficiently that the normal heat in the building will maintain the valve seat member at a temperature above the freezing point of water. By applying a handwheel 66 to the squared end 37 of the stem 48 and rotating same, for example in an anti-clockwise direction, engagement of the threads 55 and 56 effect longitudinal movement of the valve rod and valve member 20 to retract the valve washer 25 from engagement with the seat 24 and effect opening of the valve for flow of water from the water pipe 8 in the building, around the valve member 20, through the tube 28, into the chamber 37 and out of the outlet fitting 4. After sufficient water has flowed from the faucet, the handwheel is turned in reverse direction, for example clockwise, whereby the threads 55 and 56 effect longitudinal movement of the valve rod to move the valve member 21 toward the seat 24 and engage the valve washer 25 therewith to interrupt flow of water through the faucet. All of the water contained in the tube 28 and chamber 37 will drain from the outlet tubing and since the water at the valve is maintained at a temperature above freezing there is no water left in the exposed portion of the faucet to freeze. With this arrangement, water service may be maintained on the exterior of the building at any temperature eliminating the necessity of turning off the water service inside of the building to prevent freezing thereof in cold weather.

What I claim and desire to secure by Letters Patent is:

A faucet comprising, a body member having a chamber therein and an outlet from said chamber, said body member having an inlet bore and counterbore, an elongate relatively thin walled tubular member having one end secured in the counterbore of said body member and having a bore in registry with said inlet bore for communication with said chamber, an annular flange on the body member adjacent the connection of the tubular member and body member, an annular rib on the body member and extending from the annular flange around and spaced from the tubular member for engaging in an opening of a wall to support the body member and prevent lateral movement thereof, a valve seat member having smaller outside transverse dimensions than the annular rib, said valve seat member having one end adapted for connection with a liquid conduit and having a flow passage therethrough providing communication for liquid flow from a liquid conduit, said valve seat member having a counterbore in the other end thereof in which the other end of the tubular member is secured with the flow passage of said valve seat member in registry with the bore of the tubular member, a seat in said valve seat member in axial alignment with the flow passage, valve means in the bore of said tubular member adapted for engagement with said seat for interrupting liquid flow therethrough, the periphery of the valve means being spaced from the bore and passage walls for flow of liquid therebetween, the registry of the inlet bore of the body member, tubular member bore and the flow passage of the valve seat member cooperating to present a smooth internal bore to fluid flow for complete drainage of liquid therethrough, a valve rod operatively connected with the valve means and extending through the tubular member bore into the chamber of the body member, a stem extending from the exterior of the body member into the chamber therein and secured to the valve rod in axial alignment therewith, packing in the body member engaging the stem to prevent liquid leakage therearound, means for rotating said stem, and cooperative means in the body member and on the stem for effecting longitudinal movement of said stem, valve rod and valve means in response to rotation of said stem for controlling flow of liquid through the faucet.

JOHN HENRY HODES, JR.

REFERENCES CITED

The following references are of record in the file of this patent:

UNITED STATES PATENTS

| Number | Name | Date |
|---|---|---|
| 536,801 | Gaghan | Apr. 2, 1895 |
| 657,562 | Neumeyer | Sept. 11, 1900 |
| 928,047 | Harnett | July 13, 1909 |
| 968,711 | Stevenson | Aug. 30, 1910 |
| 1,317,789 | Hoar | Oct. 7, 1919 |
| 1,606,478 | McKamey | Nov. 9, 1926 |
| 1,888,359 | Ritchie | Nov. 22, 1932 |